(12) United States Patent
Yablonka

(10) Patent No.: US 11,228,359 B1
(45) Date of Patent: Jan. 18, 2022

(54) SYSTEM AND METHOD FOR PERFORMING MLD PREPROCESSING IN A MIMO DECODER

(71) Applicant: Ceva D.S.P. Ltd., Herzlia Pituach (IL)

(72) Inventor: Tomer Yablonka, Tel Aviv (IL)

(73) Assignee: Ceva D.S.P. Ltd., Herzlia Pituach (IL)

( * ) Notice: Subject to any disclaimer, the term of this patent is extended or adjusted under 35 U.S.C. 154(b) by 0 days.

(21) Appl. No.: 17/141,398

(22) Filed: Jan. 5, 2021

(51) Int. Cl.
 *H04B 7/08* (2006.01)
 *H04B 17/20* (2015.01)
 (Continued)

(52) U.S. Cl.
 CPC ............... *H04B 7/08* (2013.01); *H04B 1/06* (2013.01); *H04B 7/0413* (2013.01); *H04B 17/20* (2015.01)

(58) Field of Classification Search
 CPC ............. H04L 25/03171; H04L 1/005; H04L 2025/03426; H04L 25/067;
 (Continued)

(56) References Cited

U.S. PATENT DOCUMENTS

| 8,199,841 | B1 * | 6/2012 | Sarrigeorgidis | ..... H04B 7/0413 375/267 |
| 8,428,159 | B2 | 4/2013 | Atwater et al. | |

(Continued)

OTHER PUBLICATIONS

Masaaki Fujii "Pre-Whitening QR-Decomposition Maximum Likelihood Detection for Co-channel Interference Rejection in MIMO Systems", IEICE Transactions on Communications, published on Jul. 1, 2009, vol. E92.B Issue 7 pp. 2529-2532,.

(Continued)

*Primary Examiner* — Vineeta S Panwalkar
(74) *Attorney, Agent, or Firm* — Pearl Cohen Zedek Latzer Baratz LLP

(57) ABSTRACT

A method and system for performing Maximum Likelihood Detector (MLD) preprocessing in a Multiple-Input Multiple-Output (MIMO) communication system, the method including, obtaining a received signal Y a corresponding channel matrix H and a vector of noise samples n; calculating a whitening filter $L^{-H}$; whitening a channel matrix H; selecting one of a first calculation or a second calculation, based on estimated complexity of the calculations; and performing preprocessing of the received signal using the selected calculation. The first calculation includes: whitening the received signal and performing a Cordic based QR decomposition to the whitened channel matrix $\tilde{H}$ and the whitened received signal $\hat{Y}$ to obtain triangular matrix R and $\overline{Y}=Q^H L^{-H} Y$. The second calculation includes: performing a Cordic based QR decomposition to the whitened channel matrix $\tilde{H}$ and the whitening filter $L^{-H}$ to obtain triangular matrix R and $Q^H L^{-H}$, and multiplying the received signal Y by $Q^H L^{-H}$ to obtain $\overline{Y}=Q^H L^{-H} Y$.

20 Claims, 11 Drawing Sheets

(51) Int. Cl.
   *H04B 1/06*        (2006.01)
   *H04B 7/0413*      (2017.01)
(58) Field of Classification Search
   CPC ..... H04L 2025/03414; H04L 25/03318; H04L 1/0054; H04L 25/0204; H04L 5/0023; H04L 27/18; H04L 1/0003; H04L 5/0053; H04L 27/3405; H04L 5/0044; H04B 7/08; H04B 1/06; H04B 17/20; H04B 7/0413
   See application file for complete search history.

(56) References Cited

U.S. PATENT DOCUMENTS

| | | | |
|---|---|---|---|
| 8,861,651 B2 | 10/2014 | Aubert | |
| 9,112,744 B1* | 8/2015 | Venkatesh | H04L 25/0258 |
| 9,318,813 B2 | 4/2016 | Patel et al. | |
| 9,954,596 B2 | 4/2018 | Wu | |
| 2006/0268963 A1* | 11/2006 | Yoshida | H04B 7/0848 |
| | | | 375/148 |
| 2015/0098533 A1* | 4/2015 | Rusek | H04L 25/03171 |
| | | | 375/350 |
| 2016/0373204 A1* | 12/2016 | Yamada | H04J 11/0056 |

OTHER PUBLICATIONS

Foster, J., Chambers, J. and McWhirter, J., 2009. "A novel algorithm for calculating the QR decomposition of a polynomial matrix" IN: IEEE International Conference Acoustics, Speech and Signal Processing ICASSP, pp. 3177-3180.

* cited by examiner

SYSTEM AND METHOD FOR PERFORMING MLD PREPROCESSING IN A MIMO DECODER

FIELD OF THE INVENTION

Embodiments of the present invention relate generally to the field of radio frequency (RF) multiple-input-multiple-output (MIMO) systems and more particularly to performing preprocessing in a decoder of such systems.

BACKGROUND OF THE INVENTION

A MIMO receiver may include receiving antennas that receive a radio signals and an estimation section that may find channel estimation of the recovered radio signals. In order to demodulate the signal, one of the approaches is to use Maximum Likelihood Detector (MLD).

Various standards for wireless communication are known, for example, to ensure interoperability between equipment from multiple vendors. The standards typically aim to ensure that an allocated spectrum for the wireless communication system is used efficiently. One such widely adopted standard is the 3rd Generation Partnership Project (3GPP) standard. The 3GPP standard has had many revisions, including an evolution into 5G New Radio (5G NR) together with Long-Term Evolution LTE standards.

Due to the enormous rate at which information may be decoded, there is a great need in the art for providing a system and method that manages decoding signals in MIMO systems at an acceptable complexity while maintaining performance.

SUMMARY OF THE INVENTION

According to embodiments of the invention, a system and method for performing MLD preprocessing in a MIMO communication system may include, using a processor: obtaining a received signal, Y, a corresponding channel matrix, H and a vector of noise samples, n; calculating a whitening filter $L^{-H}$ based on the vector of noise samples n; whitening the channel matrix H using the whitening filter $L^{-H}$ to obtain a whitened channel matrix $\tilde{H}$; performing a coordinate rotation digital computer (Cordic) based QR decomposition to the whitened channel matrix $\tilde{H}$ and the whitening filter $L^{-H}$ to obtain triangular matrix R of the QR decomposition of the whitened channel matrix $\tilde{H}$ and $Q^H L^{-H}$; and multiplying the received signal Y by $Q^H L^{-H}$ to obtain $\bar{Y} = Q^H L^{-H} Y$. According to embodiments of the invention, performing the Cordic based QR decomposition may include performing the Cordic based QR decomposition to a widened matrix, the widened matrix being a combination of the whitened channel matrix $\tilde{H}$ and the whitening filter $L^{-H}$.

According to embodiments of the invention, a system and method for performing MLD preprocessing in a MIMO communication system, may include, using a processor: obtaining a received signal Y a corresponding channel matrix H and a vector of noise samples n; calculating a whitening filter $L^{-H}$ based on the vector of noise samples n; whitening a channel matrix H using the whitening filter $L^{-H}$ to obtain a whitened channel matrix $\tilde{H}$; whitening the received signal Y using the whitening filter $L^{-H}$ to obtain a whitened received signal $\tilde{Y}$; and performing a coordinate rotation digital computer (Cordic) based QR decomposition to the whitened channel matrix $\tilde{H}$ and the whitened received signal $\tilde{Y}$ to obtain triangular matrix R of the QR decomposition of the whitened channel matrix $\tilde{H}$ and $\bar{Y} = Q^H L^{-H} Y$. According to embodiments of the invention, performing the Cordic based QR decomposition may include performing the Cordic based QR decomposition to a widened matrix, the widened matrix being a combination of the whitened channel matrix $\tilde{H}$, and the whitened vector of the receiver antennas $\tilde{Y}$.

According to embodiments of the invention, a system and method for performing MLD preprocessing in a MIMO communication system, may include, using a processor: obtaining a received signal Y a corresponding channel matrix H and a vector of noise samples n; calculating a whitening filter $L^{-H}$ based on the vector of noise samples n; whitening a channel matrix H using the whitening filter $L^{-d}$ to obtain a whitened channel matrix $\tilde{H}$; selecting, one of a first calculation or a second calculation, based on estimated complexity of the first calculation and the second calculation; and performing preprocessing of the received signal Y using the selected calculation, wherein the first calculation comprises: whitening the received signal Y using the whitening filter $L^{-H}$ to obtain a whitened received signal $\tilde{Y}$ and performing a coordinate rotation digital computer (Cordic) based QR decomposition to the whitened channel matrix $\tilde{H}$ and the whitened received signal $\tilde{Y}$ to obtain triangular matrix R of the QR decomposition of the whitened channel matrix $\tilde{H}$ and $\bar{Y} = Q^H L^{-H} Y$, and wherein the second calculation comprises: performing a Cordic based QR decomposition to the whitened channel matrix $\tilde{H}$ and the whitening filter $L^{-H}$ to obtain triangular matrix R of the QR decomposition of the whitened channel matrix $\tilde{H}$ and $Q^H L^{-H}$, and multiplying the received signal Y by $Q^H L^{-H}$ to obtain $\bar{Y} = Q^H L^{-H} Y$.

According to embodiment of the invention, performing the Cordic based QR decomposition to the whitened channel matrix $\tilde{H}$ and the whitened received signal $\tilde{Y}$ comprises performing the Cordic based QR decomposition to a widened matrix, the widened matrix being a combination of the whitened channel matrix $\tilde{H}$ and the whitened received signal $\tilde{Y}$ and performing the Cordic based QR decomposition to the whitened channel matrix $\tilde{H}$ and the whitening filter $L^{-H}$ comprises performing the Cordic based QR decomposition to a widened matrix, the widened matrix being a combination of the whitened channel matrix $\tilde{H}$ and the whitening filter $L^{-H}$ According to embodiment of the invention, the MLD preprocessing is performed by a MIMO decoder.

Embodiments of the invention may include decoding the received signal Y by using the triangular matrix R and $\bar{Y}$ to determine a corresponding transmit signal s.

According to embodiments of the invention, the whitening filter $L^{-H}$ may be calculated by: calculating a correlation matrix $R_{nn}$ of the vector of noise samples n; and performing a Cholesky decomposition of the noise correlation matrix $R_{nn}$ to obtain the whitening filter $L^{-H}$.

According to embodiments of the invention, selecting one of the first calculation or the second calculation is performed based on a time domain decimation D_T, a frequency domain decimation D_F, and a number of transmitter antennas M.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
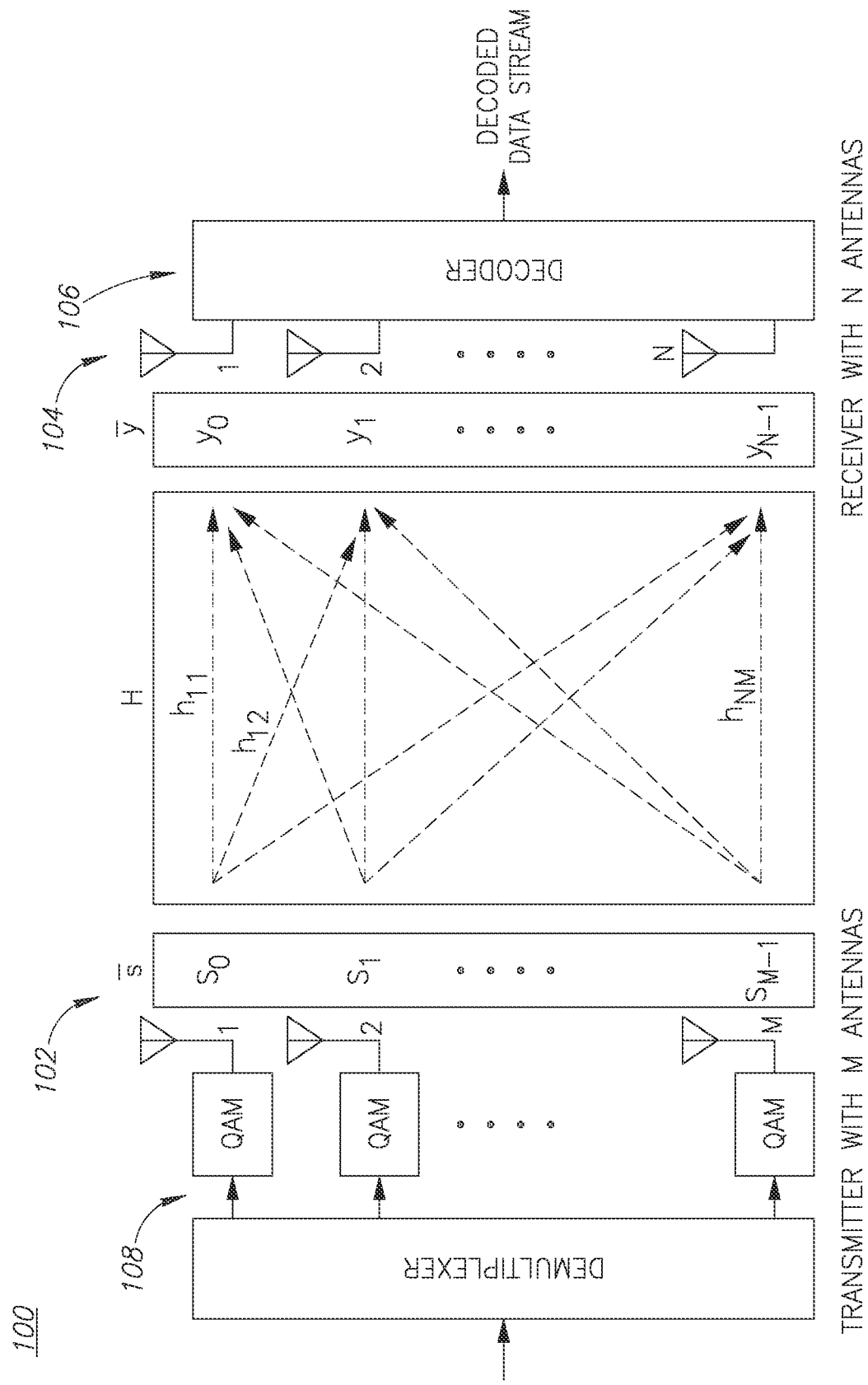
FIG. 1 is a schematic illustration of a N×M MIMO system, according to embodiments of the invention.

It wall be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention wall be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device that manipulates and/or transforms data represented as physical (e.g., electronic) quantities within the computer's registers and/or memories into other data, similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

Reference is now made to FIG. 1 depicting an N×M MIMO system 100, according to embodiments of the invention. Embodiments of the present invention may apply to various MIMO systems including LTE, 5G NR and Wi-Fi MIMO communication networks. According to embodiments of the invention, N×M MIMO system 100 may include multiple M transmitting antennae 102 sending signals to multiple N receiving antennae 104. The M transmit antennae 102 may transmit, over a channel, data streams represented by a transmit vector s. As used herein a vector may refer to a matrix where one of the dimensions is one. Receiving antennae 104 may receive data samples represented by a received signal or sample Y. The relationship between the transmitted vector s and the received signal Y may be defined in a signal model as in the following example equation:

$$Y = Hs + n \qquad \text{(Equation 1)}$$

Where H is a channel estimation matrix, also referred to as the channel matrix. The channel matrix H may include entries $h_{ij}$ that represent the relationship between the signals transmitted from the $j^{th}$ transmitter antenna 102 to the signal received by the $i^{th}$ receiver antenna 104. The dimension of the transmit vector s is M×I, the dimension of the received signal y is N×I, the dimension of the channel matrix H is N×M and n is a signal noise vector of dimension N×I with an example correlation matrix $R_{nn}$:

$$R_{nn} = \Sigma n * n^H \qquad \text{(Equation 2)}$$

A MIMO decoder 106, e.g., including a maximum likelihood decoder (MLD), may decode a received signal Y by determining its corresponding transmit signal s for a given channel matrix H. Each vector s may be a vector with a number of elements equal to the number of transmit antennae 102, M, and each vector y may be a vector with a number of elements equal to the number of receive antennae 104, N. In one example of a 4×4 MIMO channel matrix H (N=M=4), each vector s and y may be a 4-vector with 4 elements.

A demultiplexer 108 may modulate transmitted signals 5, for example, using quadrature amplitude modulation (QAM) mappers with 4, 16, 64 or 256 QAM or any other type of modulation. Modulation may define a number of possible or candidate values for each vector element. For example, each element in 4 QAM or quadrature phase-shift keying (QPSK) has 4 possible values (e.g. defined by 2 bits−2^2=4 complex values (1,1), (−1,1), (−1,−1),(1,−1)), each element in 64

QAM has 64 possible values (e.g. 6 bits), etc. Decoder 106 may evaluate a total number of different transmit vectors s equal to the number of possible candidate modulation values to the power of the number of transmit antennae M to find the most likely solution for each received signal Y For example, 64 QAM, using 4×4 MIMO there are 64^4 (16.8 million) different candidate 4-vectors s.

A maximum likelihood (ML) decoder may, for example, search a tree graph to determine the most likely solution e.g., a node in the tree graph representing one element in a transmit vector s associated with a minimum difference or distance in equation (1) between H·s and the received signal Y e.g., $$\min_{s} \|y - H \cdot s\|^2.$$

However, computing such distances for the trillions of possible solutions per second supported by wireless communications standards, such as LIE advanced, is difficult.

In order to reduce the complexity of the receiver, noise whitening and QR decomposition may be performed. Noise whitening may include applying a whitening filter to the signal model. The whitening filter may be calculated using any whitening transform, for example, by calculating a Cholesky decomposition of the noise correlation matrix $R_{nn}$, such that for example:

$$L^H * L = \text{Chol}(R_{nn}) \quad \text{(Equation 3)}$$

The whitening filter may equal $L^{-H}$. Other whitening filters may be used. The whitening procedure may be performed by multiplying each component of the signal model by the whitening filter. After applying whitening filter $L^{-H}$, the new signal model is, for example:

$$\tilde{Y} = [L^{-H}Y = L^{-H}Hs + L^{-H}*n] = \tilde{H}s + \tilde{n} \quad \text{(Equation 4)}$$

Where $\tilde{Y}$ is the whitened received signal, $\tilde{H}$ is the whitened channel matrix, n is the whitened noise where the whitened noise correlation matrix $R_{\tilde{n}\tilde{n}}$ becomes an identity matrix, according to the following example:

$$R_{\tilde{n}\tilde{n}} = \Sigma_{\tilde{n}\tilde{n}}{}^H = L^{-H}(\Sigma nn^H)*L^{-1}R_{nn}L^{-1} = I \quad \text{(Equation 5)}$$

OR decomposition may simplify the search distance computation. Using QR decomposition, the whitened channel matrix $\tilde{H}$ is decomposed into matrices Q and R, such that:

$$\tilde{H} = Q_{N \times M} R_{M \times M} \quad \text{(Equation 6)}$$

$$R = Q^H \tilde{H} \quad \text{(Equation 7)}$$

$$\overline{Y} = Q^H \tilde{Y} = Q^H \tilde{H}s + Q^H \tilde{n} = Rs + \overline{n} \quad \text{(Equation 8)}$$

Where $\overline{n}$-has the same statistics (e.g., the same covariance matrix $E[n^H n]$) as n, and f is the whitened and preprocessed received signal. Matrix Q is unitary such that: $Q^H Q = I$ or $Q^{-1} = Q^H$ and matrix R is an upper triangular matrix (e.g. having real entries along its main diagonal):

$$\begin{bmatrix} r_{11} & \cdots & r_{1n} \\ 0 & r_{22} & r_{2n} \\ \vdots & \ddots & \vdots \\ 0 & 0 & r_{nn} \end{bmatrix}$$

It is evident from Equation 8 that after performing whitening and QR decomposition, the inputs for the MLD are $\overline{Y}$ and R. The calculation of $\overline{Y}$ and R may be referred to herein as preprocessing and may be performed in a preprocessing block in decoder 106.

Embodiments of the present invention provide an efficient method for calculating $\overline{Y}$, e.g., less computationally intensive than prior art calculations. By providing an efficient method for calculating $\overline{Y}$, embodiments of the invention may improve the technology of MIMO systems, and more particularly may improve preprocessing in a decoder of such systems, allowing for improved telecommunications used in, e.g. cellular telephone systems, Wi-Fi networks, and other computer data systems.

Figure 2:
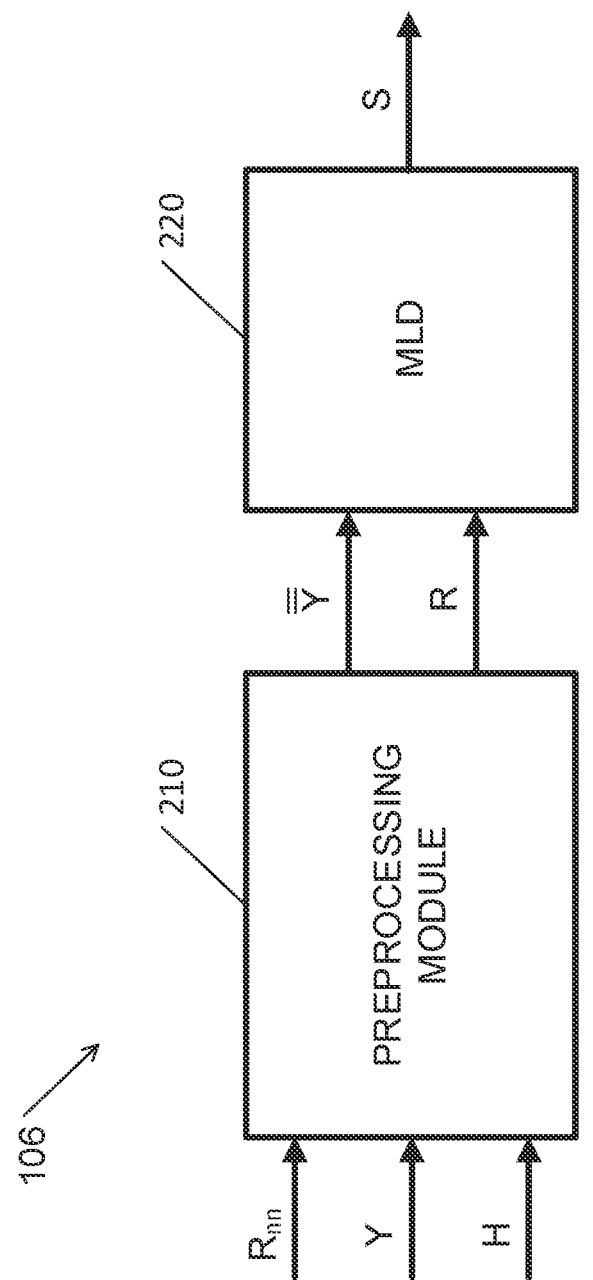
FIG. 2 is a schematic illustration of a simplified block diagram of MIMO decoder, according to embodiments of the invention.

Reference is now made to FIG. 2 which is a schematic illustration of a simplified block diagram of MIMO decoder 106, according to embodiments of the invention. According to embodiments of the invention, MIMO decoder 106 may include a preprocessing module 210 and an MLD module 220. Preprocessing module 210 may obtain the received signal Y the channel matrix H, and the noise correlation matrix $R_{nn}$. The preprocessing module 210 may calculate $\overline{Y}$ and R as disclosed herein, and provide F and R to MLD module 220 instead of the received signal Y and the channel matrix H, respectively. MLD module 220 may obtain $\overline{Y}$ and R, and may determine, calculate or estimate the transmit signal 5 using any applicable method. MLD module 220 may be or may include a hard-decision MLD or a soft-decision MLD. Using the reduced matrix may result in reduced complexity for performing estimation or calculation of the transmit signal s, comparing to estimation or calculation of the transmit signal s directly form of the received signal Y and the channel matrix H.

Figure 3:
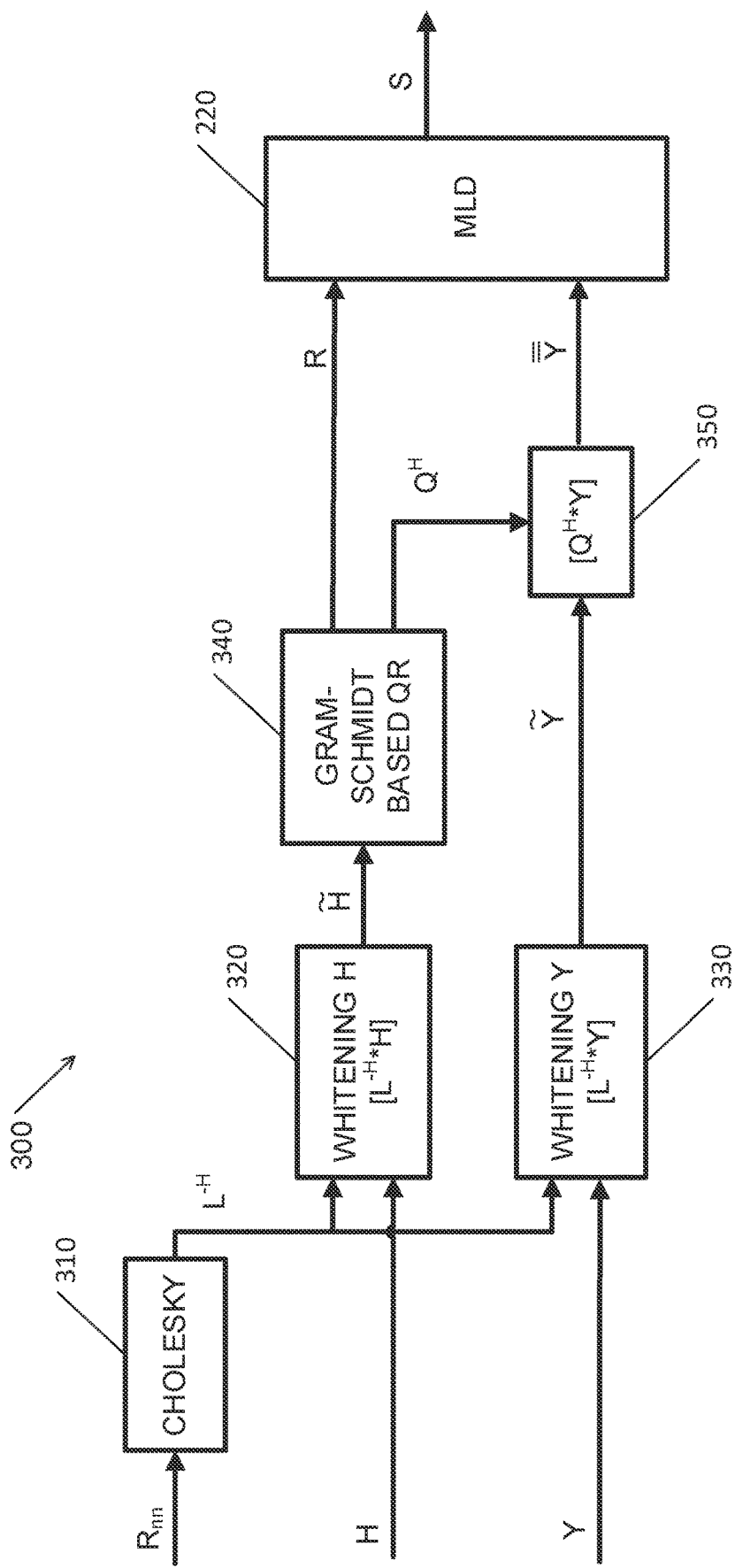
FIG. 3 is a schematic illustration of an example of a prior art preprocessing block.

Reference is now made to FIG. 3 which is a schematic illustration of an example of a prior art preprocessing block 300. Preprocessing block 330 may be an elaboration of preprocessing module 210 depicted in FIG. 2. According to the prior art, preprocessing may include obtaining the noise correlation matrix $R_{nn}$ and calculating, in block 310, a Cholesky decomposition of the noise correlation matrix $R_{nn}$ (e.g., according to Equation 3) to obtain whitening filter $L^{-H}$. In block 320 the channel matrix H may be whitened using whitening filter $L^{-H}$ to obtain the whitened channel matrix $\tilde{H}$. For example, the channel matrix H may be whitened by applying the whitening filter $L^{-H}$ according to:

$$\tilde{H} = L^{-1}H \quad \text{(Equation 9)}$$

In block 330 the received signal Y may be whitened, using whitening filter $L^{-H}$ to obtain the whitened received signal $\tilde{Y}$. For example, the received signal Y may be whitened by applying the whitening filter $L^{-H}$ to the received signal Y according to:

$$\tilde{Y} = L^{-H}Y \quad \text{(Equation 10)}$$

In block 340 Gram-Schmidth based QR decomposition may be performed on the whitened channel matrix $\tilde{H}$ to obtain matrices Q and R. R may be fed in to MLD module 220. In block 350 the whitened received signal $\tilde{Y}$ may be multiplied by $Q^H$ to obtain $\overline{Y}$, which is also fed into MLD module 220.

Figure 4:
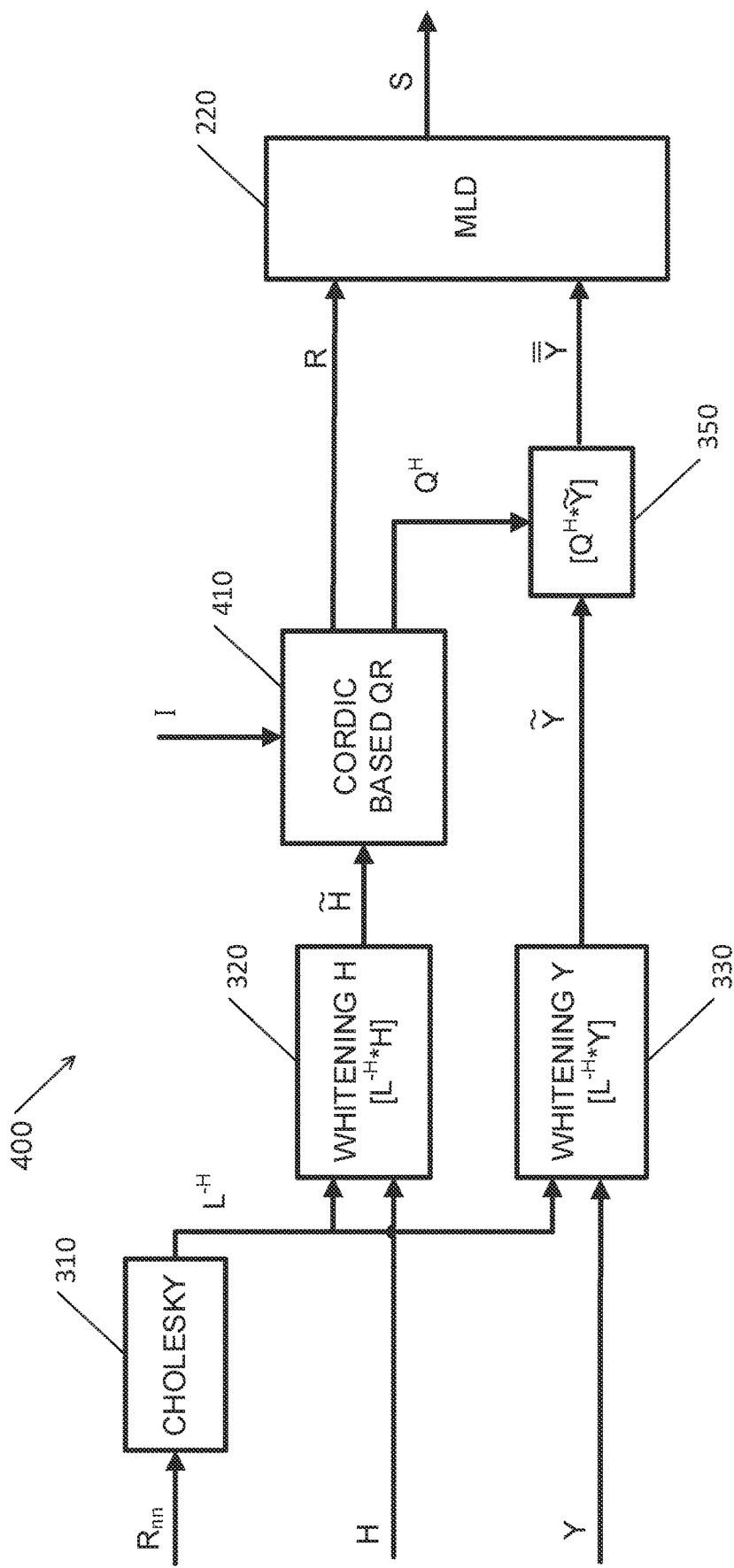
FIG. 4 is a schematic illustration of a second example of a prior art preprocessing block.

Reference is now made to FIG. 4 which is a schematic illustration of a second example of a prior art preprocessing block 400. Preprocessing block 400 may be generally similar to preprocessing block 300, only the Gram-Schmidt based QR decomposition block 340 of preprocessing block 300 is replaced with coordinate rotation digital computer (Cordic) based QR decomposition block 410, also referred to as Givens Rotation (GR) QR decomposition. Cordic based QR decomposition block 410 may obtain the whitened channel matrix $\tilde{H}$ and an identity matrix I as inputs and may perform QR decomposition to provide $Q^H$ and R. Cordic based QR decomposition block 410 may perform Givens rotation using simple shift and add operations to achieve the QR decomposition. Specially, according to the prior art, Cordic based QR decomposition block 410 may calculate a rotation angle θ which may be used to rotate the whitened channel matrix $\tilde{H}$ to obtain elements form the upper triangular matrix R. The rotation angle θ may be used to rotate the identity matrix to generate the Q matrix. According to embodiments of the invention, the principles of operation of the Cordic based QR decomposition block 410 (e.g., the inherent rotation) may be utilized to reduce the complexity of preprocessing module 210.

According to embodiments of the invention, reducing the complexity of preprocessing module 210 may be achieved by feeding other matrices to a Cordic based QR decomposition block instead of identity matrix I, as disclosed herein.

Figure 5:
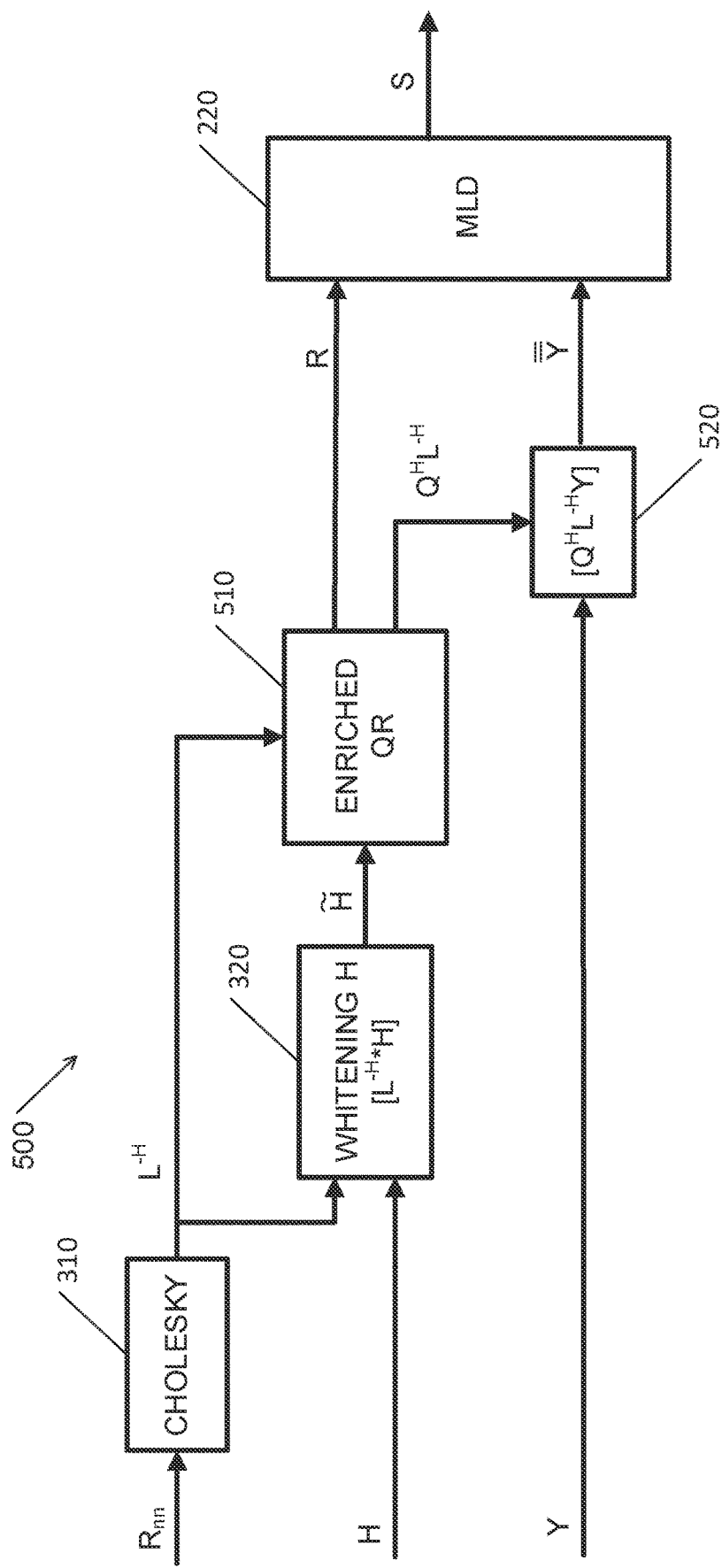
FIG. 5 is a schematic illustration of a first example of an enhanced preprocessing block, according to embodiments of the invention.

Reference is now made to FIG. 5 which is a schematic illustration of a first example of an enhanced preprocessing block 500, according to embodiments of the invention.

Preprocessing block 500 may be an elaboration of preprocessing module 210 depicted in FIG. 2. In some embodiments, enriched QR block 510 may be configured to support wider input matrix with comparison to Cordic based QR decomposition block 410. According to embodiments of the invention, instead of feeding the whitened channel matrix $\tilde{H}$ and an identity matrix I as inputs to enriched QR block 510, the identity matrix I is replaced by the whitening filter $L^{-H}$. Thus, while Cordic based QR decomposition block 410 may obtain H and an identity matrix I as inputs, enriched QR block 510 may obtain whitened channel matrix $\tilde{H}$ and the whitening filter $L^{-H}$ as inputs. As a result, enriched QR block 510 may automatically or directly generate the triangular matrix R (e.g., the same triangular matrix R of the QR decomposition of the whitened channel matrix, $\tilde{H}$), and $Q^H L^{-H}$. Thus, R and $Q^H L^{-H}$ may be calculated by performing QR decomposition over the whitened channel matrix $\tilde{H}$ and the whitening filter $L^{-H}$, in some embodiments, enriched QR block 510 may perform Cordic based QR decomposition to a widened matrix $\tilde{H}'$, where widened matrix $\tilde{H}'$ is a combination of the whitened channel matrix $\tilde{H}$ and the whitening filter $L^{-H}$, such that $\tilde{H}'=[\tilde{H}, L^{-H}]$, to directly obtain triangular matrix R and $Q^H L^{-H}$. Specifically, the Cordic sequence of calculating triangular matrix R, may generate $Q^H L^{-H}$ as well:

$$QR([\tilde{H}'])=QR([\tilde{H},L^{-H}])=[R,Q^H L^{-H}] \qquad \text{(Equation 11)}$$

Block 520 may obtain $Q^H L^{-H}$ and received signal Y, and may multiply the vector of a received signal Y by $Q^H L^{-H}$ to obtain $\bar{Y}=Q^H L^{-H} Y$. The triangular matrix R and $\bar{Y}$ may be provided as inputs to MLD module 220.

Embodiments of the enhanced preprocessing block 500 may eliminate received signal Y whitening block 330 that was needed in the prior art preprocessing block 400. Thus, received signal Y whitening block 330 that is present in prior art preprocessing blocks 300 and 400 is no longer needed in preprocessing block 500. Therefore, the computational complexity is reduced comparing to the prior art. It is noted that the dimension of $L^{-H}$ is [N×N], so the dimension of $\tilde{H}'$ is (N×(N+M)). Since in MIMO channels N is not smaller than M, in a worst case scenario the dimension of $\tilde{H}'$ equals (N×2N).

Figure 6:
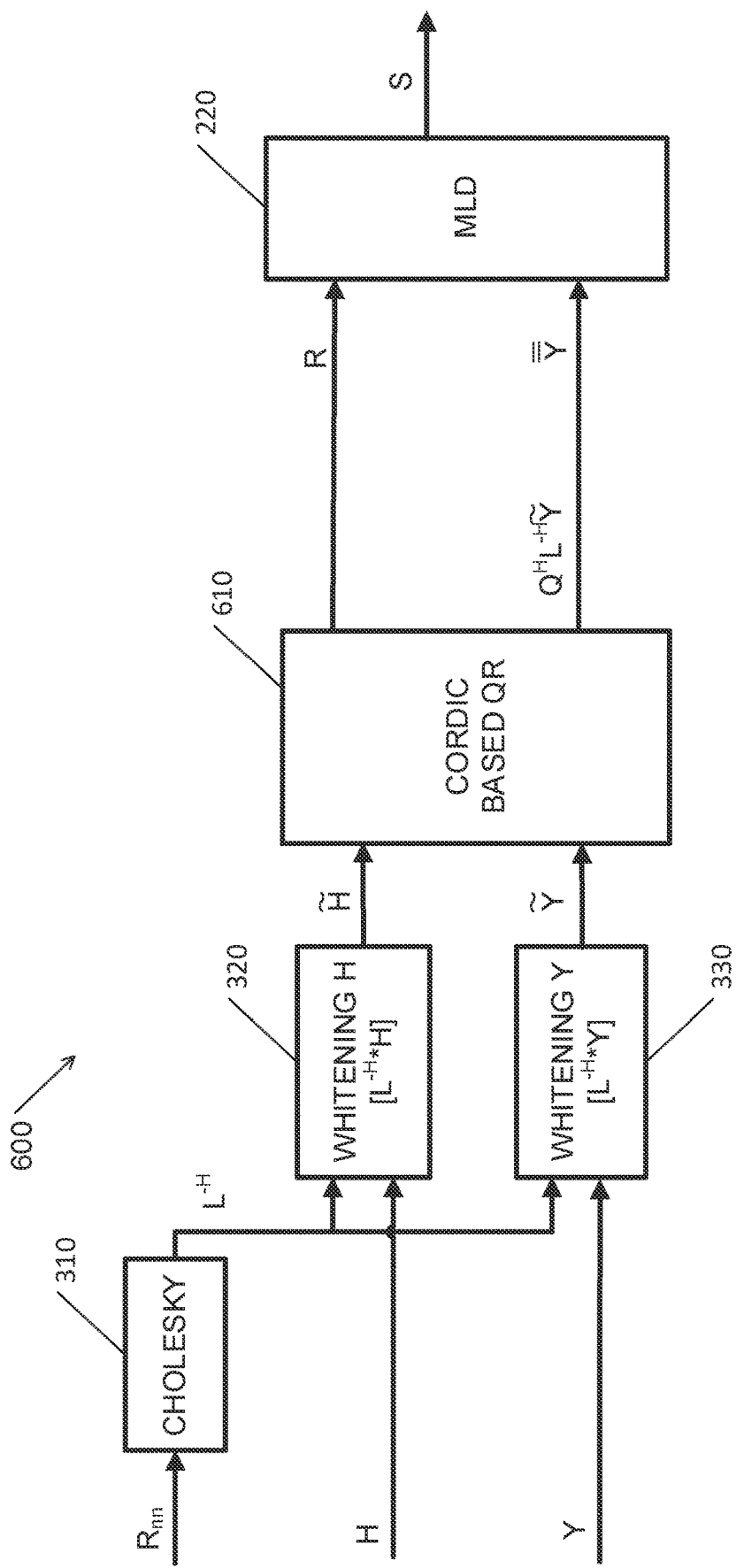
FIG. 6 is a schematic illustration of a second example of an enhanced preprocessing block, according to embodiments of the invention.

Reference is now made to FIG. 6 which is a schematic illustration of a second example of an enhanced preprocessing block 600, according to embodiments of the invention. Preprocessing block 600 may be an elaboration of preprocessing module 210 depicted in FIG. 2. According to embodiments of the invention, instead of feeding the whitened channel matrix $\tilde{H}$ and an identity matrix I as inputs to enriched QR block 610, the identity matrix I is replaced by the whitened received signal $\tilde{Y}$. As a result, enriched QR block 610 may automatically or directly generate the triangular matrix R of the QR decomposition of the whitened channel matrix $\tilde{H}$ and $\bar{Y}=Q^H L^{-H} Y$. Thus, R and $\bar{Y}$ may be calculated by performing QR decomposition over the whitened channel matrix $\tilde{H}$ and the whitened received signal $\tilde{Y}$. For example, enriched QR block 610 may perform Cordic based QR decomposition to a widened matrix $\tilde{H}''$ where widened matrix $\tilde{H}''$ is a combination of the whitened channel matrix $\tilde{H}$ and the whitened received signal $\tilde{Y}$, such that $\tilde{H}''=[\tilde{H}, \tilde{Y}]$, to directly obtain triangular matrix R and $Q^H L^{-H} Y$. For example, the Cordic sequence of calculating triangular matrix R, may generate $Q^H L^{-H}$:

$$QR([\tilde{H}''])=QR([\tilde{H},\tilde{Y}])=[R,Q^H L^{-H} Y] \qquad \text{(Equation 12)}$$

The triangular matrix R and F may be provided as inputs to MLD module 220. Embodiments of the enhanced preprocessing block 600 may eliminate matrices multiplication block 350 that was needed in prior art preprocessing method. Thus, block 350 that is present in prior art preprocessing blocks 300 and 400 is no longer needed in preprocessing block 600. Therefore, the computational complexity is reduced. It is noted that the dimension of $L^{-H} Y$ is [N×1], so the dimension of $\tilde{H}''$ is (N×N+1). This is reflected in the complexity of block 610.

The efficiency of preprocessing blocks 400, 500 and 600 may change according to the use cases and the network parameters. Specifically, the efficiency may depend on the number of transmit antennae M, the time domain decimation D_T, and the frequency domain decimation D_F. The time domain decimation D_T, and the frequency domain decimation D_F are parameters that define decimation in time and frequency, respectively, of calculation of the channel matrix H in MIMO decoders, e.g., decode 106. For example, in a 5G decoder, theoretically, each resource element (RE) may have its own specific channel matrix H. However, the calculation of the channel matrix H may be computationally intensive. Therefore, in case the channel is not frequency selective, e.g., in case channel matrix H is not changing much in the frequency domain, there may be no need to calculate channel matrix H for each RE in the frequency domain but rather for each D_F RE, e.g., jumping in the frequency by a factor referred to as the frequency domain decimation D_F. The time domain decimation T_D is the equivalent decimation parameter in the time domain, that may depend on the speed of the change in the time domain (e.g., doppler effect).

The following calculation applies to an N×M MIMO channel. The cycle count or number of multiply-accumulate (MAC) operations required of blocks of the prior art solution presented in FIG. 4 is presented in Table 1. The calculation of the required MAC operations is presented in Table 1. The required MAC operations may be an estimation of the basic kernels or a matric for comparing between embodiments of the invention and prior art. In real world applications, the estimated number of required MAC operations may be slightly different because of implementation approaches and overhead. In the following section. A, B and C may refer to an estimation of the required number of MAC operations for performing the referred calculation or operation in a time slot or a time period (e.g., 1 millisecond, 10 milliseconds, 1 second, etc.), in the use case on no decimation, e.g., D_F=T_D=1.

TABLE 1

Estimated number of MAC operations for blocks of the prior art calculation of R and $\tilde{Y}$:

| Block | Operation | Matrices Dimension | Estimated number of MAC operations |
|---|---|---|---|
| 320 | $L^{-H}H$ | (NxN * NxM) | A |
| 330 | $L^{-H}Y$ | (NxN * Nx1) | B |
| 410 | QR of Nx2 * M matrix | | C |
| 350 | $Q^H * \tilde{Y}$ | (NxN * NxM) | B |

The total number of MAC operations of the prior art preprocessing block 400 presented in FIG. 4 may equal:

$$\text{Prior an preprocessing block 400 total MAC} = (A+C)/D\_T/D\_F + 2*B \quad \text{(Equation 13)}$$

As can be seen in Equation 13, the calculations performed by blocks 320 and 410 may be decimated by D_F and T_D since the channel matrix H is decimated. There is no need to repeat the calculations performed by blocks 320 and 410 as long as the channel matrix H constant, and the channel matrix is H constant in the intervals of D_F in the frequency domain and T_D in the time domain. The calculations in blocks 330 and 350, however, depend on the input data F, and therefore have to be performed for each RE with no decimation.

The estimated number of MAC operations of blocks of the enhanced preprocessing block 500 presented in FIG. 5 is presented in Table 2.

TABLE 2

Estimated number of MAC operations for blocks of enhanced preprocessing block 500 calculation of R and $\tilde{Y}$:

| Block | Operation | Matrices Dimension | Estimated number of MAC operations |
|---|---|---|---|
| 320 | $L^{-H}H$ | (NxN * NxM) | A |
| 510 | QR of Nx2 * M matrix | | C |
| 350 | $(Q^H L^{-H}) * Y$ | (NxN * Nx1) | B |

The total estimated number of MAC operations of enhanced preprocessing block 500 presented in FIG. 5 may equal:

$$\text{Enhanced preprocessing block 500 total MAC} = (A+C)/D\_T/D\_F + B \quad \text{(Equation 14)}$$

It is evident from Equations 13 and 14 that the total estimated number of MAC operations of enhanced preprocessing block 500 is smaller than the total estimated number of MAC operations of prior art preprocessing block 400 by B. This is true for all channel conditions, e.g., regardless of the number of transmit antennae M, the time domain decimation D_T, and the frequency domain decimation D_F.

For example, a typical use case of a 5G NR network may include 4×4 MIMO configuration, carrier bandwidth of 100 MHz, sub-carrier spacing of 30 KHz, and thus 3276 sub-carriers in a symbol. The number of symbols in a slot may be 14 and the number of slots in a second may be 2000. Thus, the number of REs or received signal vectors Y in a second may equal 3276*14*2000=~90M (Mega/). R which is the number of MAC operations required for the calculation of $(Q^H L^{-H})*Y$ (here in a time period of one second) may equal 4*4*90M=~1.5G (Giga) multiply-accumulate (MAC) operations. Thus, in this use case, reducing the required number of MAC operations by B may save up to 1.5G MAC operations per second.

The estimated number of MAC operations for blocks of enhanced preprocessing block 600 presented in FIG. 6 is presented in Table 3.

TABLE 3

Estimated number of MAC operations for blocks of enhanced preprocessing block 600 calculation of R and $\tilde{Y}$:

| Block | Operation | Matrices Dimension | Estimated number of MAC operations |
|---|---|---|---|
| 320 | $L^{-H}H$ | (NxN * NxM) | A |
| 330 | $L^{-H}Y$ | (NxN * Nx1) | B |
| 610 | QR of Nx(M + 1) matrix | | C/2 * (M + 1)/M |

The total estimated number of MAC operations of enhanced preprocessing block 600 presented in FIG. 6 may equal for example:

$$\text{Enhanced preprocessing block 600 total MAC} = A/D\_T/D\_F + B + C/2*(M+1)/M \quad \text{(Equation 15)}$$

Compering enhanced preprocessing block 500 estimated number of MAC operations as expressed in Equation 14 with enhanced preprocessing block 600 total estimated number of MAC operations as expressed in Equation 15, it is apparent that for some channel conditions (e.g., values of the number of transmit antennae M, the time domain decimation D_T, and the frequency domain decimation D_F) enhanced preprocessing block 500 may have total estimated number of MAC operations that is smaller than the total estimated number of MAC operations of enhanced preprocessing block 600, while for other channel conditions the opposite may be true.

According to embodiments of the invention, the values of the channel conditions, e.g., the number of transmit antennae M, the time domain decimation D_T, and the frequency domain decimation D_F, (and/or other parameters that may affect D_T and D_P) may be examined, and R and $\tilde{Y}$ may be calculated by either enhanced preprocessing block 500 or enhanced preprocessing block 600 based on comparison of the estimated number of MAC operations of both blocks. Thus, a preprocessing method (e.g., using enhanced preprocessing block 500 or enhanced preprocessing block 600) may be selected dynamically during routine operation of decode 106, according to the estimated complexity of the calculation of each preprocessing block, that may depend on the channel conditions.

In some embodiments, the estimated complexity may be compared based on equations 14 and 15. Thus, if, based on equations 14 and 15, enhanced preprocessing block 500 has total estimated number of MAC operations that is smaller than the total estimated number of MAC operations of enhanced preprocessing block 600, than enhanced preprocessing block 500 may be used to calculate R and $\tilde{Y}$, and otherwise enhanced preprocessing block 600 may be used to calculate R and $\tilde{Y}$. Rearranging Equations 14 and 15 may yield that enhanced preprocessing block 500 may be selected if $1/(T\_D*F\_D)$ is smaller than $(1+1/M)/2$, and enhanced preprocessing block 600 may be used otherwise.

In some embodiments, the complexity of the calculations may be estimated by measuring offline the actual number of MAC operations required by enhanced preprocessing block 500 and by enhanced preprocessing block 600 for a plurality of use cases and/or channel conditions, e.g., for a plurality of combinations of values of the number of transmit antennae M, the time domain decimation D_T, and the frequency domain decimation D_F. The results of the offline measurements may be used to compare the estimated complexity, e.g., the actual number of MAC operations, of enhanced preprocessing block 500 and enhanced preprocessing block 600 in the plurality of use cases and/or channel conditions, and for preparing a lookup table with suggested enhanced preprocessing block for each use case and/or channel condition, e.g., for a plurality of combinations of values of the number of transmit antennae M, the time domain decimation Off, and the frequency domain decimation OF. The lookup table may be used in real time operation for selecting between enhanced preprocessing block 500 and enhanced preprocessing block 600, based on the number of transmit antennae M, the time domain decimation D_T, and the frequency domain decimation D_F.

Dynamically selecting between enhanced preprocessing blocks 500 and 600 may further reduce the total number of MAC operations required for preprocessing, since as explained herein, the total number of MAC operations of enhanced preprocessing block 500 may always be lower than the total number of MAC operations of the prior art preprocessing block 400, and switching to enhanced preprocessing block 600 when the total number of MAC operations of enhanced preprocessing block 600 is lower than the total number of MAC operations of enhanced preprocessing block 500 may further reduce the total number of MAC operations.

Figure 7:
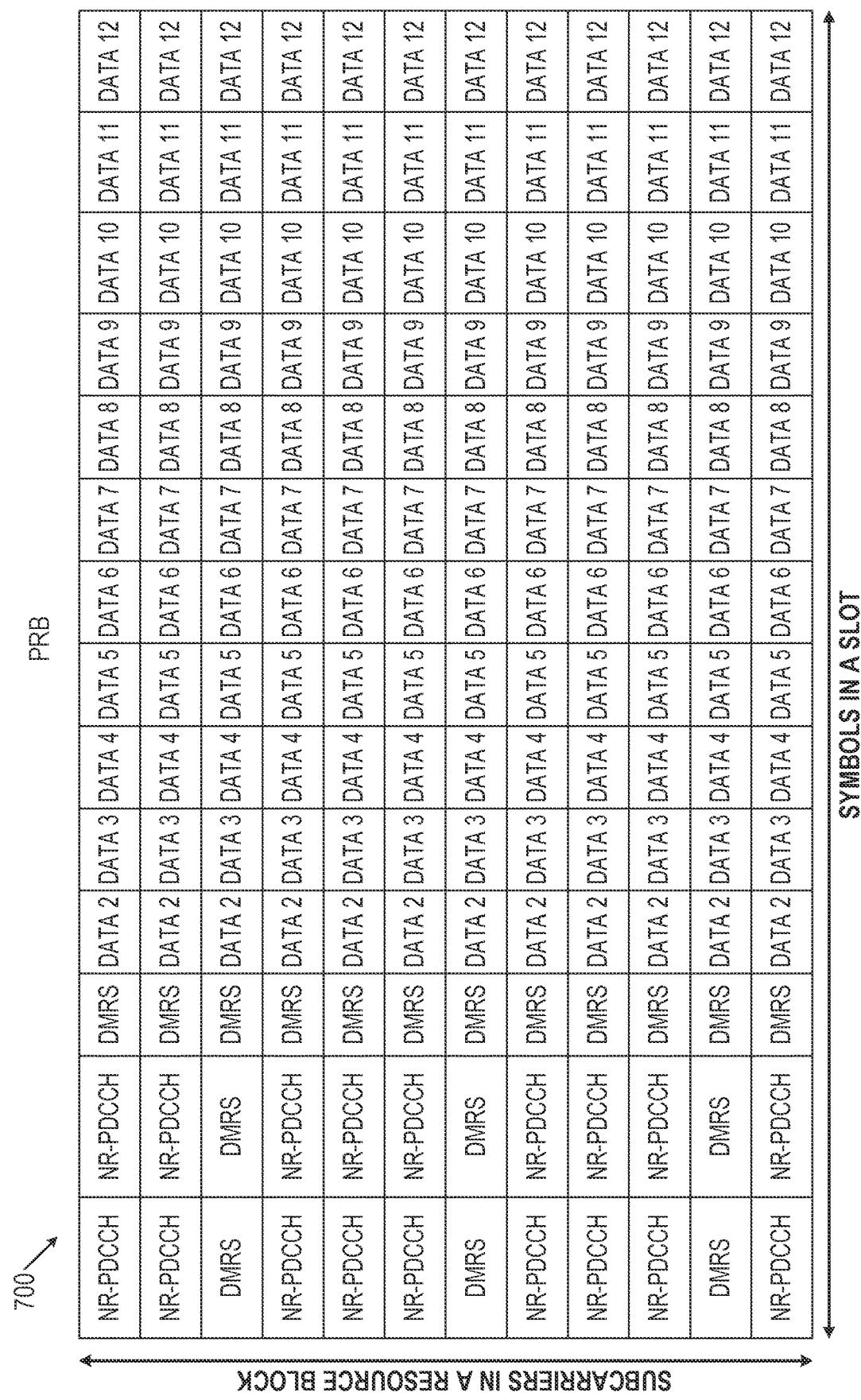
FIG. 7 depicts an example of 5G slot of a physical downlink channel with front-loaded DMRS location, helpful in demonstrating embodiments of the invention.
Figure 8:
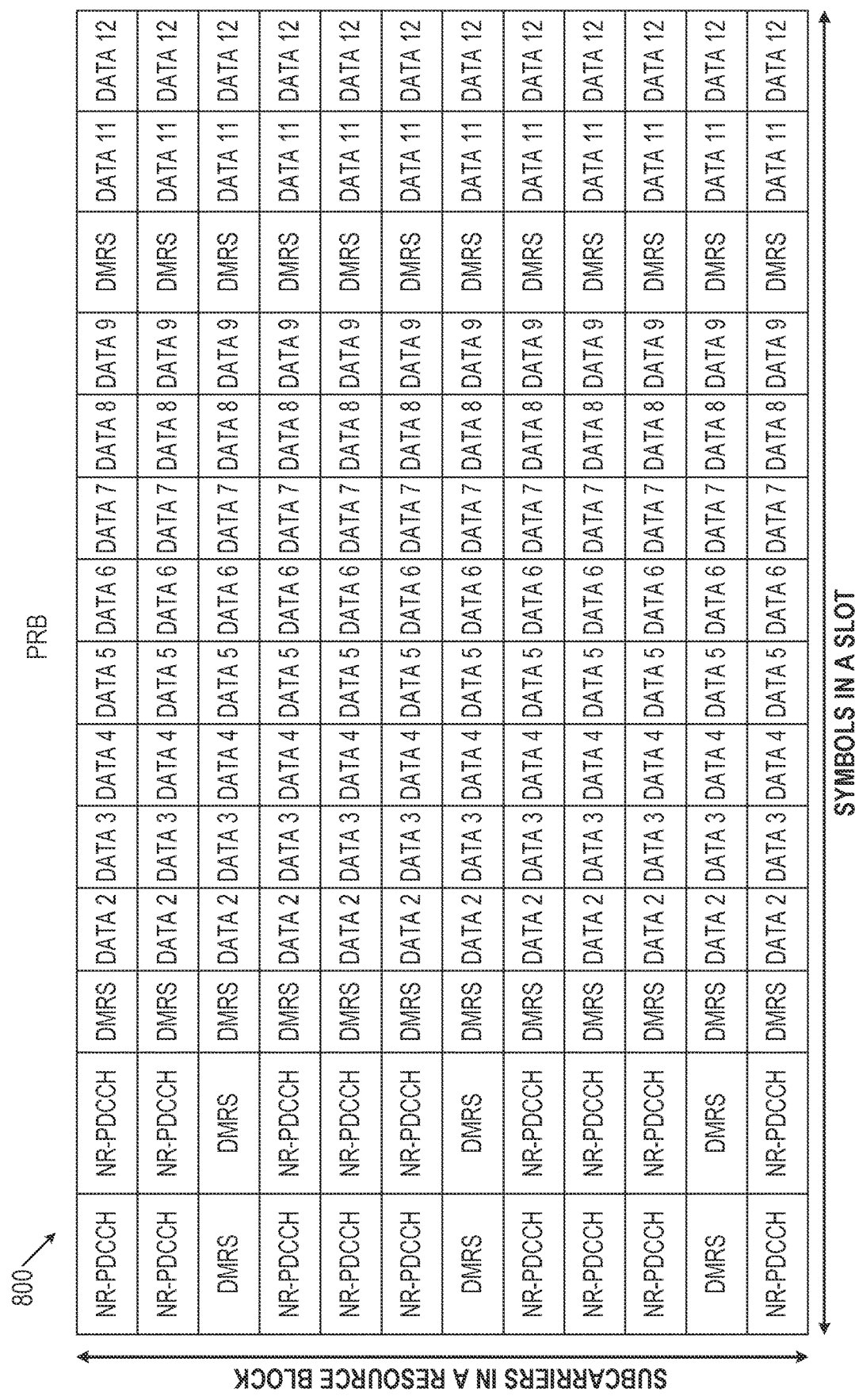
FIG. 8 depicts another example of 5G slot of a physical downlink channel, helpful in demonstrating embodiments of the invention.

Reference is no made to FIGS. 7 and 8, each depicting an example of 5G slot 700 and 800, respectively, of a physical downlink channel, helpful in demonstrating embodiments of the invention. The 5G slot is divided in the frequency domain into subcarriers, and further divided in the time domain to define physical resource blocks (PRB), which are the smallest unit of resources that can be allocated to a user. Each PRB may carry control signals or data signals, according to the relevant standards (e.g., LTE or 5G). Control PRBs may include new radio physical downlink control channel (NR PDCCH) that carry control channel data (DO) and demodulation reference signal (DMRS) which is a reference signal that helps the receiver, e.g., decoder 106 of a user equipment (UE), to decode the NR PDCCH. Other PRBs may include data. Slot 700 may include front-loaded (e.g., occurring early in the transmission) DMRS location which may not require time interpolation, while slot 800 may include additional DMRS positions and may be generally used in high Doppler channels that may probably need a time filter interpolation.

Figure 9:
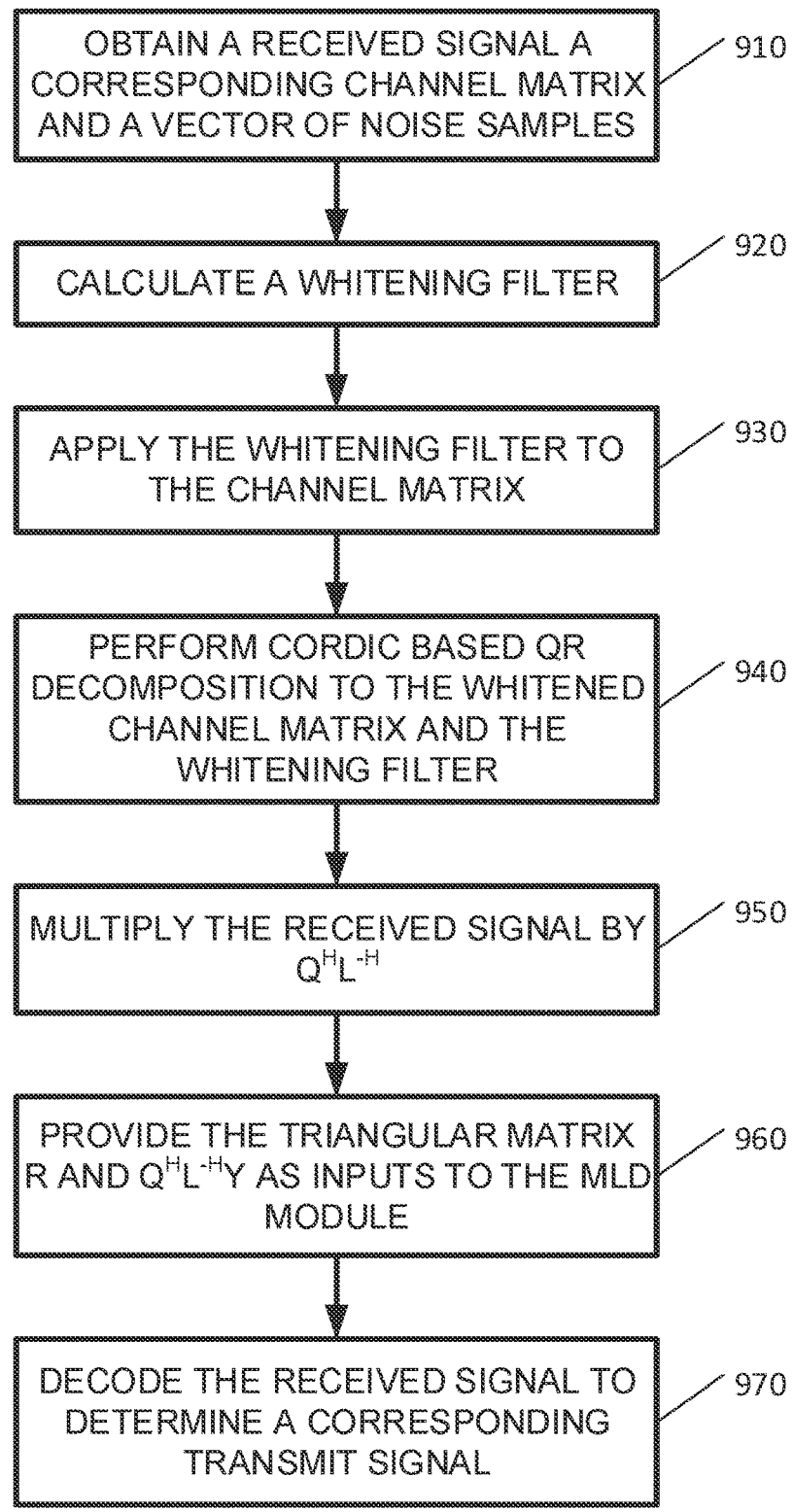
FIG. 9 is a high-level flowchart illustrating a first method for decoding a received signal in a MIMO communication system, according to embodiments of the invention.

Reference is made to FIG. 9, which is a high-level flowchart illustrating a first method for decoding a received signal in a MIMO communication system, according to embodiments of the invention. An embodiment of the first method for decoding a received signal may be performed, for example, by decoder 106 shown in FIG. 1, or by systems shown in FIGS. 2, 5 and 12.

In operation 910 a received signal Y, a channel matrix H corresponding to signal Y, and a vector of noise samples n may be received or obtained, e.g., by decoder 106. In operation 920, a whitening filter $L^{-H}$ may be calculated based on the vector of noise samples n. For example, a whitening filter $L^{-H}$ may be calculated by calculating a correlation matrix $R_{nn}$ of the vector of noise samples n as presented in Equations 2, and performing Cholesky decomposition of the noise correlation matrix $R_{nn}$, as presented in Equation 3. In operation 930, the channel matrix H may be whitened, e.g., by applying the whitening filter $L^{-H}$ to the channel matrix H to obtain a whitened channel matrix $\tilde{H}$, e.g., as expressed in example Equation 9.

In operation 940, a Cordic based QR decomposition may be performed to the whitened channel matrix $\tilde{H}$ and the whitening filter $L^{-H}$, to obtain triangular matrix R of the QR decomposition of the whitened channel matrix $\tilde{H}$ and $Q^H L^{-H}$. For example, performing the Cordic based QR decomposition to the whitened channel matrix H and the whitening filter $L^{-H}$ may include performing the Cordic based QR decomposition to a widened matrix $\tilde{H}'$, the widened matrix being a combination of the whitened channel matrix $\tilde{H}$ and the whitening filter $L^{-H}$, such that $\tilde{H}'=[\tilde{H}, L^{-H}]$, e.g., as expressed in Equation 11. In operation 950, the received signal Y may by multiplied by $Q^H L^{-H}$ to obtain $\overline{Y} = Q^H L^{-H} Y$. In operation 960, the triangular matrix R and $\overline{Y}$ may be provided as inputs to an MLD module, e.g., MLD module 220. In operation 970, the received signal Y may be decoded by using the triangular matrix R and $\overline{Y}$ to determine a corresponding transmit signal s, e.g., using MLD module 220. In some embodiments operations 910-950 may be referred to as a preprocessing stage of a MIMO cellular communication decoder. Operations 910-950 may be performed, for example, by preprocessing module 210.

Figure 10:
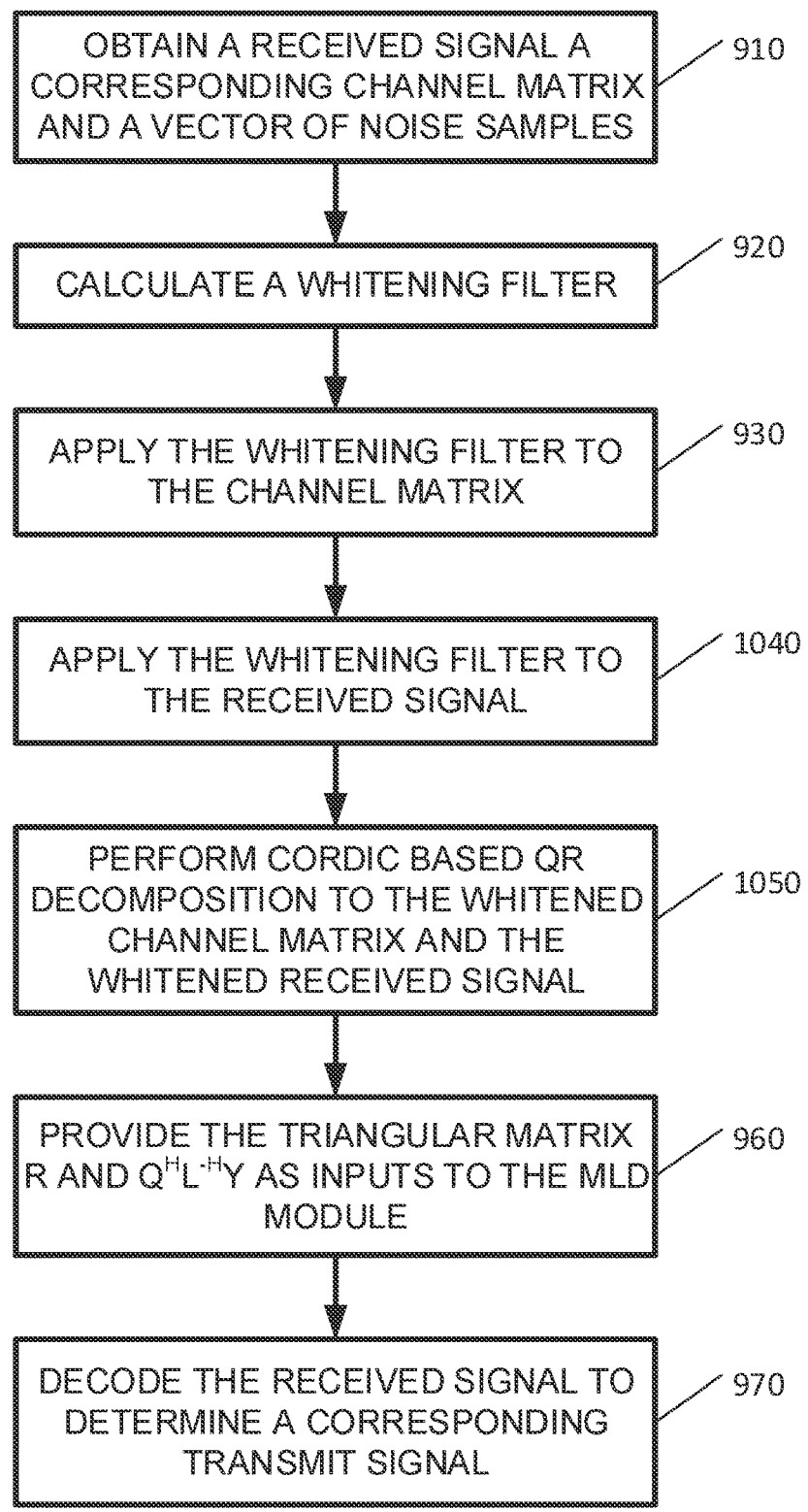
FIG. 10 is a high-level flowchart illustrating a second method for decoding a received signal in a MIMO communication system, according to embodiments of the invention.

Reference is made to FIG. 10, which is a high-level flowchart illustrating a second method for decoding a received signal in a MIMO communication system, according to embodiments of the invention. An embodiment of the second method for decoding a received signal may be performed, for example, by decoder 106 shown in FIG. 1, or systems shown in FIGS. 2, 6 and 12. A portion of embodiments of the second method for decoding a received signal may be similar to operations performed in embodiments of the first method for decoding a received signal presented in FIG. 9, and will not be described again. In operation 1040, the received signal Y may be whitened using the whitening filter $L^{-H}$ to obtain a whitened received signal $\tilde{Y}$, e.g., by applying the whitening filter $L^{-H}$ to the received signal Y as expressed in Equation 10. In operation 1050, a Cordic based QR decomposition may be performed to the whitened channel matrix $\tilde{H}$ and the whitened received signal $\tilde{Y}$ to obtain triangular matrix R of the QR decomposition of the whitened channel matrix $\tilde{H}$ and $\overline{Y} = Q^H L^{-H} Y$. For example performing the Cordic based QR decomposition may include performing the Cordic based QR decomposition to a widened matrix $\tilde{H}''$, the widened matrix $\tilde{H}''$ being a combination of the whitened channel matrix $\tilde{H}$, and the whitened vector of the receiver antennas $\tilde{Y}$, such that $\tilde{H}''=[\tilde{H}, \tilde{Y}]$, e.g., as expressed in Equation 12. Similarly to the embodiments of the first method for decoding a received signal, in operation 960 the triangular matrix R and $\overline{Y}$ may be provided as inputs to an MLD module that may, in operation 970, decode the received signal Y by using the triangular matrix R and $\overline{Y}$ to determine a corresponding transmit signal s.

Figure 11:
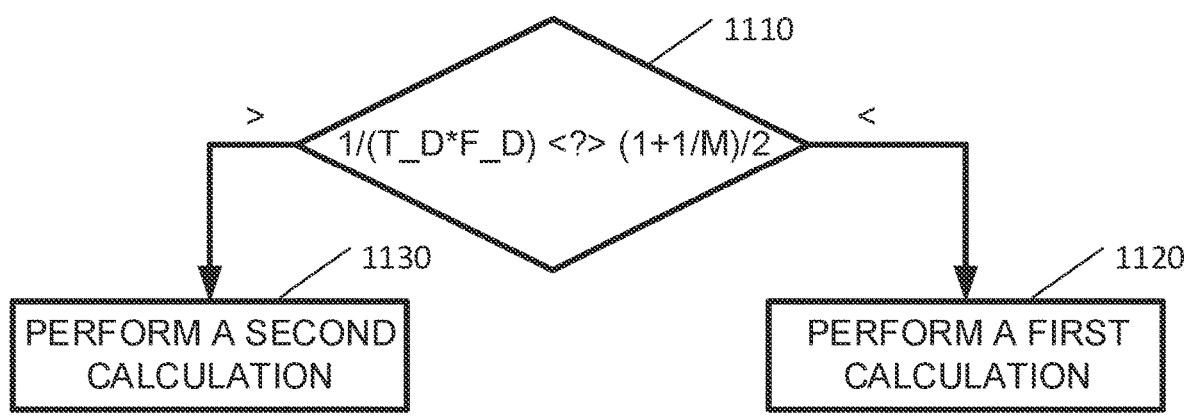
FIG. 11, is a high-level flowchart illustrating a method for combining the first and second methods for decoding a received signal in a MIMO communication system, according to embodiments of the invention.

Reference is made to FIG. 11, which is a high-level flowchart illustrating a method for combining the first and second methods for decoding a received signal in a MIMO communication system, according to embodiments of the invention. An embodiment of the second method for decoding a received signal may be performed, for example, by decoder 106 shown in FIG. 1, or by systems shown in FIGS. 2, 5, 6 and 12.

In operation 1110, the relation between 1/(T_D*F_D) and (1+1/M)/2 may be determined. According to some embodiments, the first calculation may be performed if $$\frac{1}{T\_D * F\_D}$$

is smaller than $$\left(1+\frac{1}{M}\right)/2,$$

as indicated in operation 1120, and the second calculation may be performed otherwise, as indicated in operation 1120. Other conditions may be used.

Figure 12:
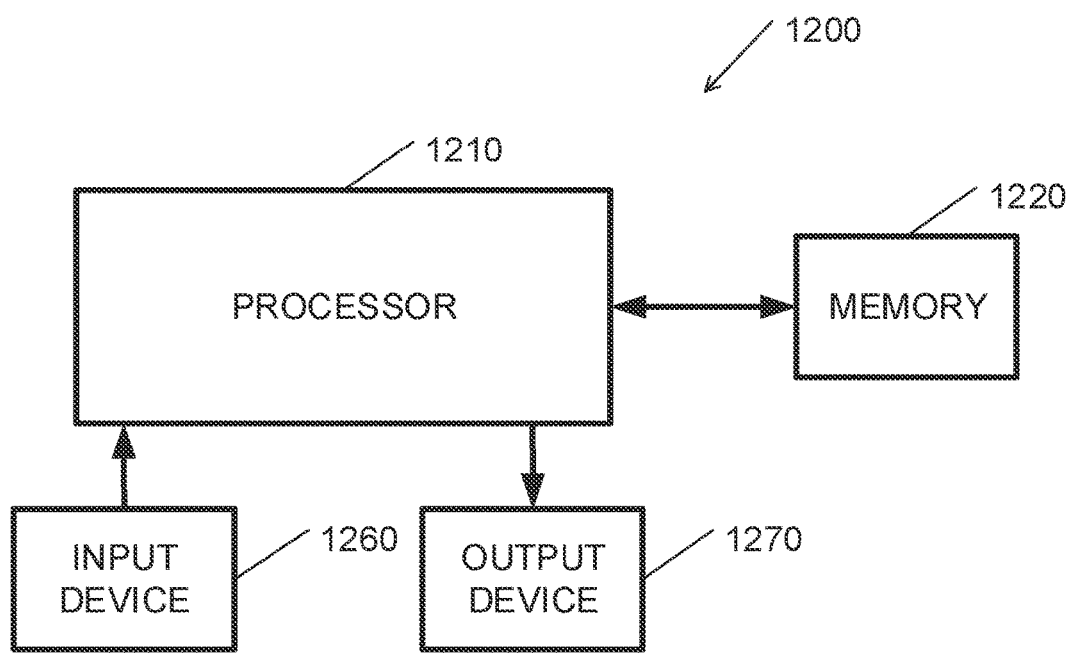
FIG. 12 is schematic illustration of an exemplary device according to embodiments of the invention.

Reference is made to FIG. 12, which is a schematic illustration of an exemplary device according to embodiments of the invention. A device 1200 may include a computer device having a wireless communication capabilities, including for example, a MIMO decoder, e.g., MIMO decoder 106 located in a UE, a smartphone, a cellular telephone or communications device, a cellular telephone, etc. Device 1200 may include any device capable of executing a series of instructions, for example for performing the methods disclosed herein. Device 1200 may include an input device 1260 such as a mouse, a receiver, a keyboard, a microphone, a camera, a Universal Serial Bus (USB) port, a compact-disk (CD) reader, any type of Bluetooth input device, etc., and an output device 1270, for example, a transmitter or a monitor, projector, screen, printer, speakers, or display.

Device 1200 may include a processor 1210. Processor 1210 may include or may be a vector processor, a central processing unit (CPU), a digital signal processor (DSP), a microprocessor, a controller, a chip, a microchip, a field-programmable gate array (FPGA), an application-specific integrated circuit (ASIC) or any other integrated circuit (IC), or any other suitable multi-purpose or specific processor or controller.

Device 1200 may include a memory unit 1220. Memory unit 1220 may be or may include any of a short-term memory unit and/or a long-term memory unit. Memory unit 1220 may include, for example, random access memory (RAM), dynamic RAM (DRAM), flash memory, volatile memory, non-volatile memory, a tightly-coupled memory (TCM), a buffer, a cache, such as an L-1 cache and/or an L-2 cache, or other suitable memory units or storage units. Memory unit 1220 may be implemented as separate (for example, "off-chip") or integrated (for example, "on-chip") memory unit, or as both.

Processor 1210 may request, retrieve, and process data from memory unit 1220 and may control, in general, the pipeline flow of operations or instructions executed on the data. Processor 1210 may receive instructions, for example, from a program memory (for example, in memory unit 1220 to perform methods disclosed herein. According to embodiments of the present invention, processor 1210 may receive instructions to decoding a received signal in a MIMO communication system including a preprocessing stage, according to embodiments of the invention.

Embodiments of the invention may be implemented for example on an integrated circuit (IC), for example, by constructing processor 1210, as well as other components of FIG. 12 in an integrated chip or as a part of an chip, such as an ASIC, an FPGA, a CPU, a DSP, a microprocessor, a controller, a chip, a microchip, etc.

According to embodiments of the present invention, some units e.g., processor 1210, as well as the other components of FIG. 12, may be implemented in a hardware description language (HDL) design, written in Very High Speed Integrated Circuit (VHSIC) hardware description language (VHDL), Verilog HDL, or any other hardware description language. The HDL design may be synthesized using any synthesis engine such as SYNOPSYS® Design Compiler 2000.05 (DC00), BUILDGATES® synthesis tool available from, inter alia, Cadence Design Systems, Inc. An ASIC or other integrated circuit may be fabricated using the HDL design. The HDL design may be synthesized into a logic level representation, and then reduced to a physical device using compilation, layout and fabrication techniques, as known in the art.

Embodiments of the present invention may include a computer program application stored in non-volatile memory, non-transitory storage medium, or computer-readable storage medium (e.g., hard drive, flash memory, CD ROM, magnetic media, etc.), storing instructions that when executed by a processor (e.g., processor 1210) carry out embodiments of the invention. Processor 1210 may be configured to carry out embodiments described herein by for example executing software or instructions.

Embodiments described in this disclosure may include the use of a special purpose or general-purpose computer including various computer hardware or software modules, as discussed in greater detail below.

Embodiments within the scope of this disclosure also include computer-readable media, or non-transitory computer storage medium, for carrying or having computer-executable instructions or data structures stored thereon. The instructions when executed may cause the processor to carry out embodiments of the invention. Such computer-readable media, or computer storage medium, can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly view's the connection as a computer-readable medium. Thus, any such connection is properly termed a computer-readable medium. Combinations of the above should also be included within the scope of computer-readable media.

Computer-executable instructions comprise, for example, instructions and data which cause a general-purpose computer, special purpose computer, or special purpose processing device to perform a certain function or group of functions. Although the subject matter has been described in language specific to structural features and/or methodological acts, /////////it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computer" may be any computing system as previously defined herein, or any module or combination of modulates running on a computing system.

For the processes and/or methods disclosed, the functions performed in the processes and methods may be implemented in differing order as may be indicated by context. Furthermore, the outlined steps and operations are only provided as examples, and some of the steps and operations may be optional, combined into fewer steps and operations, or expanded into additional steps and operations.

The present disclosure is not to be limited in terms of the particular embodiments described in this application, which are intended as illustrations of various aspects. Many modifications and variations can be made without departing from its scope. Functionally equivalent methods and apparatuses within the scope of the disclosure, in addition to those enumerated, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used in this disclosure is for the purpose of describing particular embodiments only, and is not intended to be limiting.

This disclosure may sometimes illustrate different components contained within, or connected with, different other components. Such depicted architectures are merely exemplary, and many other architectures can be implemented which achieve the same or similar functionality.

The invention claimed is:

1. A method for performing Maximum Likelihood Detector (MLD) preprocessing in a Multiple-Input Multiple-Output (MIMO) communication system, the method comprising, using a processor:
    obtaining a received signal, Y, a corresponding channel matrix, H and a vector of noise samples, n;
    calculating a whitening filter $L^{-H}$ based on the vector of noise samples n;
    whitening the channel matrix H using the whitening filter $L^{-H}$ to obtain a whitened channel matrix $\tilde{H}$;
    performing a coordinate rotation digital computer (Cordic) based QR decomposition to the whitened channel matrix $\tilde{H}$ and the whitening filter $L^{-H}$ to obtain triangular matrix R of the QR decomposition of the whitened channel matrix $\tilde{H}$ and $Q^H L^{-H}$; and
    multiplying the received signal Y by $Q^H L^{-M}$ to obtain $\overline{Y} = Q^H L^{-H} Y$.

2. The method of claim 1, wherein performing the Cordic based QR decomposition comprises performing the Cordic based QR decomposition to a widened matrix, the widened matrix being a combination of the whitened channel matrix $\tilde{H}$ and the whitening filter $L^{-H}$.

3. The method of claim 1, wherein the MLD preprocessing is performed by a MIMO decoder.

4. The method of claim 1, comprising decoding the received signal F by using the triangular matrix R and $\overline{Y}$ to determine a corresponding transmit signal s.

5. The method of claim 1, wherein the whitening filter $L^{-H}$ is calculated by:
    calculating a correlation matrix $R_{nn}$ of the vector of noise samples n; and
    performing a Cholesky decomposition of the noise correlation matrix $R_{nn}$ to obtain the whitening filter $L^{-H}$.

6. A method for performing Maximum Likelihood Detector (MLD) preprocessing in a Multiple-Input Multiple-Output (MIMO) communication system, the method comprising, using a processor:
    obtaining a received signal Y a corresponding channel matrix H and a vector of noise samples n;
    calculating a whitening filter $L^{-M}$ based on the vector of noise samples n;
    whitening a channel matrix H using the whitening filter $L^{-H}$ to obtain a whitened channel matrix $\tilde{H}$;
    whitening the received signal Y using the whitening filter $L^{-H}$ to obtain a whitened received signal $\tilde{Y}$; and
    performing a coordinate rotation digital computer (Cordic) based QR decomposition to the whitened channel matrix $\tilde{H}$ and the whitened received signal $\tilde{Y}$ to obtain triangular matrix R of the QR decomposition of the whitened channel matrix $\tilde{H}$ and $\overline{Y} = Q^H L^{-H} Y$.

7. The method of claim 6, wherein performing the Cordic based QR decomposition comprises performing the Cordic based QR decomposition to a widened matrix, the widened matrix being a combination of the whitened channel matrix $\tilde{H}$, and the whitened vector of the receiver antennas $\tilde{Y}$.

8. The method of claim 6, wherein the MLD preprocessing is performed by a MIMO decoder.

9. The method of claim 6, comprising decoding the received signal Y by using the triangular matrix R and $\overline{Y}$ to determine a corresponding transmit signal s.

10. The method of claim 6, wherein the whitening filter $L^{-H}$ is calculated by:
    calculating a correlation matrix $R_{nn}$ of the vector of noise samples n; and
    performing a Cholesky decomposition of the noise correlation matrix $R_{nn}$ to obtain the whitening filter $L^{-H}$.

11. A method for performing Maximum Likelihood Detector (MLD) preprocessing in a Multiple-Input Multiple-Output (MIMO) communication system, the method comprising, using a processor:
    obtaining a received signal Y a corresponding channel matrix H and a vector of noise samples n;
    calculating a whitening filter $L^{-M}$ based on the vector of noise samples n;
    whitening a channel matrix H using the whitening filter $L^{-H}$ to obtain a whitened channel matrix $\tilde{H}$;
    selecting, one of a first calculation or a second calculation, based on estimated complexity of the first calculation and the second calculation; and
    performing preprocessing of the received signal Y using the selected calculation,
    wherein the first calculation comprises:
        whitening the received signal Y using the whitening filter $L^{-H}$ to obtain a whitened received signal $\tilde{Y}$ and performing a coordinate rotation digital computer (Cordic) based QR decomposition to the whitened channel matrix $\tilde{H}$ and the whitened received signal $\tilde{Y}$ to obtain triangular matrix R of the QR decomposition of the whitened channel matrix $\tilde{H}$ and $\overline{Y} = Q^H L^{-H} Y$,
    and wherein the second calculation comprises:
        performing a Cordic based QR decomposition to the whitened channel matrix $\tilde{H}$ and the whitening filter $L^{-H}$ to obtain triangular matrix R of the QR decomposition of the whitened channel matrix $\tilde{H}$ and $Q^H L^{-H}$, and
        multiplying the received signal Y by $Q^H L^{-H}$ to obtain $\overline{Y} = Q^H L^{-H} Y$.

12. The method of claim 11, wherein performing the Cordic based QR decomposition to the whitened channel matrix $\tilde{H}$ and the whitened received signal $\tilde{Y}$ comprises performing the Cordic based QR decomposition to a widened matrix, the widened matrix being a combination of the whitened channel matrix $\tilde{H}$ and the whitened received signal $\tilde{Y}$.

13. The method of claim 11, wherein performing the Cordic based QR decomposition to the whitened channel matrix $\tilde{H}$ and the whitening filter $L^{-H}$ comprises performing the Cordic based QR decomposition to a widened matrix, the widened matrix being a combination of the whitened channel matrix $\tilde{H}$ and the whitening filter $L^{-H}$.

14. The method of claim 11, wherein the MLD preprocessing is performed by a MIMO decoder.

15. The method of claim 11, comprising decoding the received signal Y by using the triangular matrix R and $\tilde{Y}$ to determine a corresponding transmit signal s.

16. The method of claim 11, wherein the whitening filter, $L^{-H}$ is calculated by:
- calculating a correlation matrix $R_{nn}$ of the vector of noise samples n; and
- performing a Cholesky decomposition of the noise correlation matrix $R_{nn}$ to obtain the whitening filter $L^{-H}$.

17. The method of claim 11, comprising:
- estimating the complexity of the first calculation and the second calculation based on a time domain decimation D_T, a frequency domain decimation D_F, and a number of transmitter antennas M.

18. A Multiple-Input Multiple-Output (MIMO) decoder comprising:
- a memory;
- a processor configured to:
  - obtain a received signal, Y, a corresponding channel matrix, H and a vector of noise samples, u;
  - calculate a whitening filter $L^{-H}$ based on the vector of noise samples n;
  - whiten the channel matrix H using the whitening filter $L^{-H}$ to obtain a whitened channel matrix $\tilde{H}$;
  - perform a coordinate rotation digital computer (Cordic) based QR decomposition to the whitened channel matrix $\tilde{H}$ and the whitening filter $L^{-H}$ to obtain triangular matrix R of the QR decomposition of the whitened channel matrix $\tilde{H}$ and $Q^H L^{-H}$;
  - multiply the received signal Y by $Q^H L^{-H}$ to obtain $\tilde{Y} = Q^H L^{-H} Y$.

19. The MIMO decoder of claim 18, wherein the processor is configured to perform the Cordic based QR decomposition by performing the Cordic based QR decomposition to a widened matrix, the widened matrix being a combination of the whitened channel matrix $\tilde{H}$ and the whitening filter $L^{-H}$.

20. The MIMO decoder of claim 18, wherein the processor is configured to decode the received signal F by using the triangular matrix R and $\tilde{Y}$ to determine a corresponding transmit signal s.

* * * * *